No. 680,114. Patented Aug. 6, 1901.
C. BLOKER.
ANIMAL TRAP.
(Application filed June 3, 1901.)
(No Model.)
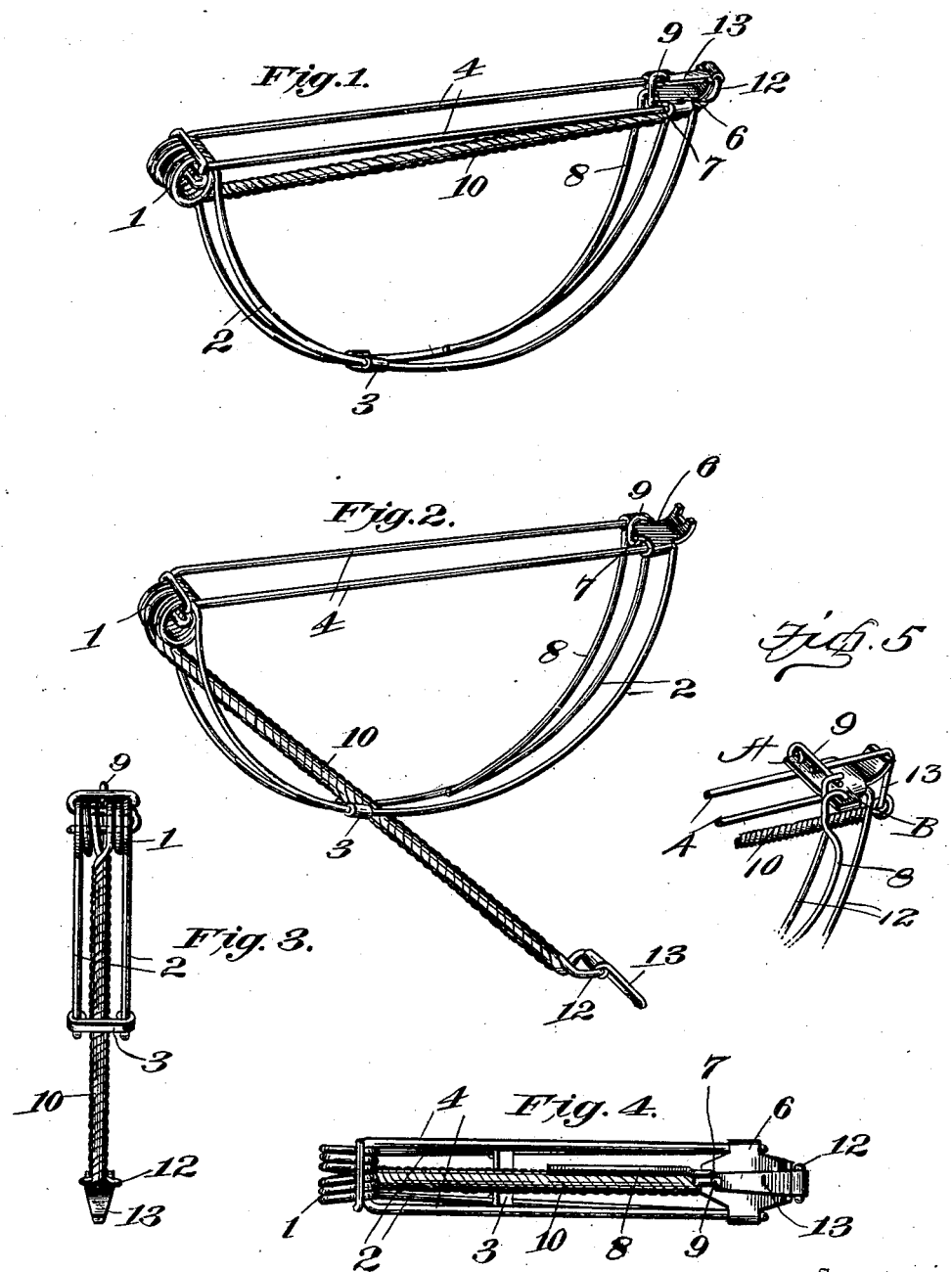
Witnesses
Elmer Seavey
Inventor
Charles Bloker,
By H. R. Williston & Co.
Attorneys

UNITED STATES PATENT OFFICE.

CHARLES BLOKER, OF KENSETT, IOWA, ASSIGNOR OF ONE-HALF TO A. H. BJORGO, OF SAME PLACE.

ANIMAL-TRAP.

SPECIFICATION forming part of Letters Patent No. 680,114, dated August 6, 1901.

Application filed June 3, 1901. Serial No. 62,906. (No model.)

*To all whom it may concern:*

Be it known that I, CHARLES BLOKER, a citizen of the United States, residing at Kensett, in the county of Worth and State of Iowa, have invented certain new and useful Improvements in Animal-Traps; and I do declare the following to be a full, clear, and exact description of the invention, such as will enable others skilled in the art to which it appertains to make and use the same.

The invention relates to animal-traps of the choke type.

The object of the invention is to provide a device of this character which shall be simple of construction, durable in use, comparatively inexpensive of production, and efficient in action.

With this and other objects in view the invention consists of certain novel features of construction, combination, and arrangement of parts, which will be hereinafter more fully described, and particularly pointed out in the appended claim.

In the accompanying drawings, Figure 1 is a perspective view of the trap, showing it in set position. Fig. 2 is a similar view showing it sprung. Fig. 3 is a rear edge view. Fig. 4 is a top plan view, and Fig. 5 is a fragmentary perspective view illustrating a modified form of my invention.

Referring to the drawings, 1 denotes a coiled spring, from which extend and are preferably made integral therewith the parallel bails 2, spaced apart and held in position by a connecting-link 3 and formed at their upper ends with horizontal extensions 4, which extend back to the spring and have their ends twisted back and forth through the same to strengthen the coil and at the same time secure the ends of the horizontal portions rigidly in place. The horizontal portions are held in their separated position by a bridge 6, the forward end of which projects upwardly and is notched, and the rear end of which is formed with an eye 7, in which is pivoted a trigger 8, the lower end of which is curved and projects downwardly, while the upper end is provided with a toe 9, which is hereinafter to be described.

10 denotes the choker-rod, which is formed integral with the coiled spring and of twisted wire. This rod plays between the bails in advance of the link, which, in addition to its function of holding the bails separated, also acts as a stop for said rod to limit its downward movement. The forward end of the rod is formed with an eye 12, to which is pivoted a lever 13, which, when the trap is set, is adapted to fulcrum in the notched end of the bridge and to have its inner end in engagement with the toe of the trigger.

An animal or rodent in the act of passing through the bails comes in contact with the trigger, which will be moved, and thus release the lever and permit the spring choker-rod to fly downwardly, thus choking the animal or rodent between said rod and the parallel bails.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof—as, for instance, if desired, I may provide the bridge 6 with two laterally-extending arms *a* and *b*, as shown in Fig. 5, and pivot the trigger 8 to one of these arms and pivot the rod 9 to the other arm. The lever 13, carried by the choker-rod, will be swung down over the bridge and will be engaged by the pivoted rod, which will have its loose end connected to the hinged end of the trigger.

Having thus described my invention, what I claim, and desire to secure by Letters Patent, is—

In a trap of the character described, the combination with a coiled spring terminating in bail-wires having horizontal extensions which are secured to the coiled spring, of a bridge secured to the bail-wires to hold them spaced apart, a choker-rod formed integral with the coiled spring and adapted to move between said bail-wires, a trigger pivoted to the bridge and having a curved lower end and a toe at its upper end, and a lever pivoted to the free end of the choker-rod and adapted to engage and hold up the toe of the trigger, substantially as set forth.

In testimony whereof I have hereunto set my hand in presence of two subscribing witnesses.

CHARLES BLOKER.

Witnesses:
N. E. HAUGEN,
A. H. BJORGO.